United States Patent [19]

Bredeweg

[11] Patent Number: 4,950,723

[45] Date of Patent: Aug. 21, 1990

[54] ORGANIC ACID HALIDE NEUTRALLIZING AGENTS FOR ANIONIC POLYMERIZATIONS

[75] Inventor: Corwin J. Bredeweg, Midland, Mich.

[73] Assignee: The Dow Chemical Company, Midland, Mich.

[21] Appl. No.: 299,202

[22] Filed: Jan. 23, 1989

[51] Int. Cl.$^5$ ............................. C08F 2/38; C08F 6/02
[52] U.S. Cl. ...................................... 526/84; 526/173; 526/340; 528/491; 528/495; 528/496; 525/250; 525/314
[58] Field of Search ......................... 526/84, 173, 340; 528/491, 495, 496; 525/250, 314

[56] References Cited

U.S. PATENT DOCUMENTS

| | | | |
|---|---|---|---|
| 3,801,554 | 4/1974 | Selman | 526/84 X |
| 4,172,190 | 10/1979 | Tung et al. | 526/173 |
| 4,415,695 | 11/1983 | Sarkar | 526/173 X |
| 4,636,540 | 1/1987 | Warfel | 526/173 X |

*Primary Examiner*—Joseph L. Schofer
*Assistant Examiner*—F. M. Teskin

[57] ABSTRACT

A process for neutralizing the terminated remnant of an alkali metal anionic polymerization initiator comprising contacting the remnant with an organic acid halide.

5 Claims, No Drawings

ORGANIC ACID HALIDE NEUTRALLIZING AGENTS FOR ANIONIC POLYMERIZATIONS

BACKGROUND OF THE INVENTION

The present invention relates to a process for preparing polymers by means of anionic polymerization. More particularly the present invention relates to a new method for neutralizing the basic species remaining after the termination of such anionic polymerization reactions.

It is previously known in the art to prepare polymers of monovinylidene aromatic monomers and alkadiene monomers via anionic polymerization. Highly useful polymers are prepared in the form of block copolymers containing one or more blocks of a monovinylidene aromatic polymer and one or more blocks of an alkadiene polymer. Suitably such polymers are prepared in an organic solvent.

The initiators use in the anionic polymerization of monovinylidene aromatic monomers and alkadiene monomers are typically very strong bases. Examples are the alkali metal organyl compounds, particularly sodium and lithium alkyls. After polymerization is complete, the terminal monomer group of the living polymer anion may be terminated, for example, by reaction with a suitable proton donating agent such as an organic alcohol, organic acid or an epoxy containing compound. This results in the formation of an alkali metal containing remnant, either an alkali metal alkoxide or alkali metal carboxylic acid salt. In addition the living polymer may be coupled. During the coupling process termination may or may not also occur depending on the type of coupling agent employed. The use of polyhalide coupling compounds, such as silicon tetrachloride, carbon tetrachloride, ethylene dibromide, etc., results in both coupling and termination of the living polymer anion. If a polyvinyl compound, such as divinyl benzene is employed to couple the polymer anion, the resulting product remains a living anion which must still be terminated with a proton donating species. If a polyepoxide coupling compound is employed, such as epoxidized soybean oil or epoxidized linseed oil, the resulting polymer contains a remnant lithium alkoxide functionality and the polymerization is simultaneously terminated. Processes for coupling living polymers by the use of epoxides have been previously disclosed in U.S. Pat. No. 3,639,517, the teachings of which are incorporated herein by reference thereto.

Whenever any of the foregoing techniques of polymer termination or coupling are employed which result in the formation of an alkali metal alkoxide remnant it has now been discovered that a deleterious effect may result under certain circumstances due to an undesired reaction between such remnants and additives incorporated into the mixture. In particular in the industrial preparation of block copolymers it is often desirable to include an antioxidant in the polymeric syrup to prevent oxidative and mechanical degradation of the polymer during devolatilization and finishing. However, it has now been discovered that many of the suitable antioxidants employed in such formulations can react with the alkali metal remnant resulting from the forgoing termination or coupling reaction thereby forming undesirable products or at least inhibiting the ability of the antioxidant to prevent oxidative degradation of the resulting polymer.

Consequently, certain polymer products which contain alkali metal remnants and an antioxidant have been found to be lacking in both color retention and in aging stability. In particular it has been found that after further mechanical and thermal treatment the melt viscosity of certain polymeric products may change. In addition such polymeric products tend to have increased yellowing and physical properties, such as ultimate tensile strength, may be adversely affected.

In U.S. Pat. No. 4,415,695 it is proposed to employ boric acid as a neutralizing agent in an anionic polymerization. Disadvantageously when boric acid is employed as a neutralizing agent in the preparation of a block copolymer of a monovinylidene aromatic monomer and an alkadiene, certain product formulations may still possess an undesirable increase in melt viscosity upon long term thermal aging.

It would be desirable if there were provided an improved process for preparing polymers by means of anionic polymerization techniques employing a method of neutralizing the remnants formed by reaction of a terminating agent and the alkali metal polymeric anion that does not adversely affect the polymer properties.

SUMMARY OF THE INVENTION

According to the present invention there is now provided a process for preparing polymers by means of the anionic polymerization of polymerizable monomers the steps of the process comprising:

(a) contacting one or more anionically polymerizable monomers selected from the group consisting of monovinylidene aromatic monomers and alkadienes with an alkali metal containing anionic initiator under anionic polymerization conditions;

(b) terminating the polymerization by contacting the reaction mixture with a hydroxyl containing compound of the formula $R—(OH)_n$ wherein R is an aromatic or aliphatic group of up to 10 carbons and n is one or two, or an epoxy or polyepoxy containing compound;

(c) neutralizing the alkali metal containing remnant resulting from the termination reaction of step (b) by contacting the reaction mixture with an organic acid halide; and (d) recovering the resulting polymer.

Also included within the scope of the present invention is a polymeric product prepared by anionic polymerization containing residual quantities of an alkali metal compound which is the product formed by reaction of an alkali metal alkoxide formed by the polymer termination reaction and an amount of an organic acid halide sufficient to neutralize such alkali metal alkoxide compound.

DETAILED DESCRIPTION

Processes for the anionic polymerization of polymerizable monomers, especially diene monomers and/or monovinylidene aromatic monomers are well known in the art. Initial work utilizing sodium initiators such as sodium naphthalene (J. Amer. Chem. Soc., 78, 2656, 1956) was later followed by lithium containing initiators such as secondary butyllithium (U.S. Pat. Nos. 3,321,635 and 3,265,765). More recent process improvements have led to precise control of the polymerization to produce polymers having a wide variety of physical properties. Examples include EP No. 210,677 which discloses an adiabatic polymerization of styrene in cyclohexane followed by addition of butadiene monomer. Additional anionic techniques include hybrid Ziegler- Natta/anionic methods disclosed in U.S. Pat. No. 4,480,075; the use of Lewis bases to control diene vinyl content (U.S. Pat. No. 4,530,985); and various hydrogenation techniques to provide saturated polymeric products (U.S. Pat. Nos. 4,595,749, 4,035,445). The teachings of all of the foregoing references are incorporated herein in their entirety by reference thereto.

In addition to monofunctional initiators such as the aforementioned lithium alkyls there have been proposed certain difunctional lithium-containing initiators suitable for the use in the direct preparation of block copolymers of dienes and monovinylidene aromatic monomers. Such difunctional initiators are disclosed in U.S. Pat. Nos. 3,660,536; 3,776,893; 3,954,894; 4,172,190; 4,196,153; 4,200,718; 4,205,016; 4,431,777; 4,427,837; and 4,614,768, the teachings of these references are also incorporated by reference thereto.

Preferred polymerizable monomers for use according to the present invention include the well known alkadienes, especially butadiene and isoprene, as well as nonovinylidene aromatic monomers especially styrene, α-methylstyrene and ring alkyl substituted derivatives thereof. A most preferred monovinylidene aromatic monomer is styrene.

Suitable hydroxyl containing compounds include the well known phenols, especially hindered phenols such as 2,6-ditertiarybutyl-4-methylphenol; alcohols, such as $C_{1\text{-}10}$ alkanols; and diols, such as ethylene glycol that are soluble in the reaction mixture. Preferred hydroxyl containing compounds are the $C_{1\text{-}4}$ alkanols.

A preferred epoxy compound is ethylene oxide. Preferred polyepoxy containing compounds include epoxidized soybean oil and epoxidized linseed oil.

Suitable organic acid halides for use according to the present invention include the well known aromatic acid halides, aromatic diacid dihalides, aliphatic monoacid halides, and aliphatic diacid dihalides wherein the halide group is chloride, bromide or a combination thereof. Preferred compositions are those having up to about 24 carbons. Most preferred are aromatic or aliphatic diacid dichlorides of from 6 to 12 carbons. Examples include isophthaloyl dichloride, terephthaloyl dichloride, sebacoyl dichloride, etc. Such higher molecular weight acid chlorides result in the formation of ester derivatives with the lithium alkoxide that are not partitioned into the recycle stream during the devolatilization step of the manufacturing process. For this reason contamination of subsequent polymerization reactions is avoided.

In the preferred practice of the present invention the organic acid halide or a mixture of organic acid halides is combined with the polymer syrup resulting from the terminated polymerization reaction. Such polymer syrup generally comprises the terminated polymer, the alkali metal containing remnant of the terminating agent, a hydrocarbon solvent such as toluene, ethylbenzene, hexane, cyclohexane, or other suitable solvent.

The amount of neutralizing agent added according to the present invention should be sufficient to neutralize the alkali metal containing remnant remaining in the reaction mixture. Preferably the equivalent ratio of neutralizing agent added to the reaction mixture based on initial initiator added is from about 0.75 to about 1.25, preferably from 0.90 to about 1.05. After addition of the neutralizing agent, antioxidant package and additional optional ingredients the solvent may be removed by devolatilization or other suitable technique and the resulting polymer recovered.

As previously mentioned, antioxidants may be usefully incorporated in the present products. Suitable anitoxidants include those compositions previously known and utilized in the art for antioxidant purposes especially hindered phenolic, phosphite or phosphonite type antioxidants. Other additives such as tackifiers, extrusion aids, UV light stabilizers, viscosity modifiers, etc. may be incorporated as desired.

Having described the invention the following example are provided as further illustrative of the invention and are not to be construed as limiting.

EXAMPLE 1

A pure triblock copolymer containing 85% by weight polyisoprene center block and 15% by weight polystyrene in the form of terminal blocks is prepared in hydrocarbon solution in a 30 gallon reactor using a difunctional anionic initiator, 1,3-phenylene-bis(1-phenylpentylidene)bis(lithium), substantially according to the technique disclosed in U.S. Pat. No. 4,172,190. The polymer is terminated with isopropyl alcohol and recovered by devolatilization. The resulting polymer has a molecular weight ($M_n$) of 150,000 (polystyrene standard) and a molecular weight distribution ($M_w/M_n$) of 1.11.

The remnant lithium isopropoxide is neutralized by adding small amounts of isophthaloyl dichloride, oleic acid and glacial acetic acid in toluene solvent to samples of the above polymer solution containing 50 grams of polymer. An antioxidant package in amounts indicated in Table I is also incorporated into the polymer solution. The polymer is then devolatilized and recovered.

The evaluation of polymer thermal stability employs a melt mixing test using a Haake Buchler Rheocard T-M System 40 mixer. In the test 46 g of polymer are charged to the mixer at 160° and 30 rpm mixing speed for 10 minutes residence time. The melt flow rate of the final product is then determined according to ASTM 1238, Schedule G. The change in melt flow rate from the value of the polymer before blending is considered to be in indication of polymer stability. This relative stability is expressed as the ratio of the melt flow rate after subjecting to heat and shear ($MFR_f$) to the melt flow rate of the polymer before the test ($MFR_o$). Results are contained in Table I.

TABLE I

| Example | Neutralizer (g/50 g polymer) | Antiox. #1 $MFR_f/MFR_o$ | Antiox. #2 $MFR_f/MFR_o$ | Antiox. #3 $MFR_f/MFR_o$ |
|---|---|---|---|---|
| Comparative | oleic acid (.188) | 1.80 | 1.30 | 2.83 |
| Comparative | acetic acid (.04) | 1.89 | 1.48 | 2.97 |
| Example 1 | isophthaloyl | 1.18 | 1.30 | 1.58 |

TABLE I-continued

| Example | Neutralizer (g/50 g polymer) | Antiox. #1 MFR$_f$/MFR$_o$ | Antiox. #2 MFR$_f$/MFR$_o$ | Antiox. #3 MFR$_f$/MFR$_o$ |
|---|---|---|---|---|
| | dichloride (.068) | | | |

Antiox. #1 is mixture of 2,6-ditertiarybutyl-4-methylphenol (0.6%) and distearyl pentaerythritol diphosphite (0.4%).
Antiox #2 is mixture of 4-((4,6-bis(octylthio)-s-triazin-2-yl)amino)-2,6-di-t-butylphenol (0.5%) and distearyl pentaerythritol diphosphite (0.4%).
Antiox #3 is mixture of 4-((4,6-bis(octylthio)-s-triazin-2-yl)amino)-2,6-di-t-butylphenol (0.5%) and trisnonylphenyl phosphite (0.4%).

As may be seen by reference to Table I, the use of an organic acid halide to neutralize remnants of the lithium alkoxide remaining after termination of the living polymer resulted in a product having improved resistance to degradation due to the effects of heat and shear as evidenced by the lower ratio of MFR$_f$/MFR$_o$ for most samples. The benefit is more noticable using certain antioxidant packages.

What is claimed is:

1. A process for preparing polymers by means of the anionic polymerization of polymerizable monomers, the steps of the process comprising:
   (a) contacting one or more anionically polymerizable monomers selected from the group consisting of monovinylidene aromatic monomers and alkadienes with an alkali metal containing anionic initiator under anionic polymerization conditions;
   (b) terminating the polymerization by contacting the reaction mixture with a hydroxyl containing compound of the formula R—(OH)$_n$ wherein R is an aromatic or aliphatic group of up to 10 carbons and n is one or two;
   (c) neutralizing the alkali metal containing remnant resulting from the termination reaction of step (b) by contacting the reaction mixture with an organic acid halide; and
   (d) recovering the resulting polymer.

2. A process according to claim 1 wherein the amount of terminating agent added to the reaction mixture based on equivalents of initiator employed is from about 0.75 to about 125.

3. A process according to claim 1 wherein the initiator is an alkyl lithium.

4. A process according to claim 3 wherein the alkyl lithium is 1,3-phenylene-bis(3-methyl-1-phenylpentylidene)bis-lithium.

5. A process according to claim 1 wherein the living polymer is coupled by reaction with a polyvinyl compound prior to termination.

* * * * *